United States Patent [19]

Sasse

[11] Patent Number: 5,462,143
[45] Date of Patent: Oct. 31, 1995

[54] CONTROLLABLE SHOCK ABSORBER FOR MOTOR VEHICLES

[75] Inventor: Thomas Sasse, Ennepetal, Germany

[73] Assignee: August Bilstein GmbH & Co. KG, Ennepetal, Germany

[21] Appl. No.: 197,600

[22] Filed: Feb. 17, 1994

[30] Foreign Application Priority Data

Feb. 17, 1993 [DE] Germany .......................... 43 04 754.8

[51] Int. Cl.$^6$ ............................. B60G 17/08; F16F 9/50
[52] U.S. Cl. .......................................... 188/299; 188/319
[58] Field of Search ................................... 188/299, 315, 188/314, 280, 282, 285, 322.14, 322.15, 322.13, 319; 280/707

[56] References Cited

U.S. PATENT DOCUMENTS

| | | | |
|---|---|---|---|
| 3,559,776 | 2/1971 | Schultze | 188/319 |
| 4,720,085 | 1/1988 | Shinbori et al. | 188/299 |
| 5,080,205 | 1/1992 | Miller et al. | 188/249 |
| 5,150,775 | 9/1992 | Charles et al. | 188/249 |
| 5,180,186 | 1/1993 | Charles et al. | 188/249 |

FOREIGN PATENT DOCUMENTS

92016771 10/1992 WIPO .................................. 188/299

*Primary Examiner*—Matthew C. Graham
*Attorney, Agent, or Firm*—Spencer, Frank & Schneider

[57] ABSTRACT

A shock absorber for an automotive vehicle includes a damping cylinder having a cylinder chamber containing damping fluid; a damping piston axially slidably received in the damping cylinder and dividing the cylinder chamber into first and second work chambers; pressure-responsive valves mounted on the damping piston for controlling the flow of fluid through the damping piston in the pressing and pulling phases; an axially hollow piston rod affixed to the damping piston and extending axially in the damping cylinder; an outer tube coaxially surrounding the damping cylinder and defining an equalizing chamber therewith; and a bottom valve assembly provided in the second work chamber. The equalizing chamber is in communication with the second work chamber through the bottom valve assembly. There are further provided a first bypass channel coupling the first and second work chambers with one another through the hollow piston rod; a second bypass channel coupling the second work chamber with the equalizing chamber by circumventing a bottom valve of the bottom valve assembly; and a setting device for controlling the first and second bypass channels as a function of relative rotary displacements between the damping cylinder and the piston rod.

12 Claims, 6 Drawing Sheets

CONTROLLABLE SHOCK ABSORBER FOR MOTOR VEHICLES

CROSS REFERENCE TO RELATED APPLICATION

This application claims the priority of German Application No. P 43 04 754.8 filed Feb. 17, 1993, which is incorporated herein by reference.

BACKGROUND OF THE INVENTION

This invention relates to a controllable shock absorber for motor vehicles. The shock absorber is of the type that includes a damping cylinder which contains damping fluid and in which a damping piston slides. The damping piston is provided with pressure-dependent valves and is connected with a piston rod. The damping piston divides the damping cylinder into two work chambers. One of the work chambers is in hydraulic communication through a bottom valve with an equalizing chamber defined between an external tube surrounding the damping cylinder and the damping cylinder itself. There is further provided a bypass channel which interconnects the work chambers and whose flow passage section is controlled by means of two setting elements which are adjustable relative to one another as a function of the relative rotation between the piston rod and the damping cylinder during steering displacement (turning) of the wheels.

In a wheel-controlled shock absorber described in German Patent No. 4,135,607 a flow passage adjustment of the bypass channel interconnecting the working chambers of the damping cylinder is effected as a function of the displacement of the wheel relative to the vehicle chassis. The damping force exerted by the shock absorber is controlled as a function of the rotary displacement between the piston rod and the damping cylinder during steering motion of the wheels.

The bypass channel extends from the upper work chamber, situated above the damping piston, through a lateral transverse port provided in the piston rod into an axial bore thereof and further extends in a hollow control rod to a valve plunger which constitutes a first setting element and which cooperates with an aperture of a second setting element, leading to the lower work chamber. The control rod is received axially slidably in the piston rod but cannot rotate relative thereto.

Since a relatively non-rotary coupling exists between the second setting element and the damping cylinder as well as between the first setting element (valve plunger) and the piston rod, upon a steering motion of the wheel connected with the damping cylinder, relative to the chassis to which the piston rod is affixed, there will occur a relative rotary motion between the damping cylinder and the piston rod and thus between the second setting element and the valve plunger received by the second setting element. As a result, the valve plunger closes the bypass channel between the work chambers of the shock absorber.

Since in a dual-tube shock absorber the damping force in the pressing phase is essentially generated by the bottom valve situated between one of the working chambers and the equalizing chamber, the effect of the conventional bypass control is always dependent upon the magnitude of the damping force generated by the bottom valve.

SUMMARY OF THE INVENTION

It is an object of the invention to provide a controllable shock absorber of the above-outlined type in which at least in the pressing phase a damping force adjustment occurs between the working chambers and simultaneously between one of the working chambers and the equalizing chamber as a function of the motion of the wheel relative to the vehicle chassis.

This object and others to become apparent as the specification progresses, are accomplished by the invention, according to which, briefly stated, the shock absorber for an automotive vehicle includes a damping cylinder having a cylinder chamber containing damping fluid; a damping piston axially slidably received in the damping cylinder and dividing the cylinder chamber into first and second work chambers; pressure-responsive valves mounted on the damping piston for controlling the flow of fluid through the damping piston in the pressing and pulling phases; an axially hollow piston rod affixed to the damping piston and extending axially in the damping cylinder; an outer tube coaxially surrounding the damping cylinder and defining an equalizing chamber therewith; and a bottom valve assembly provided in the second work chamber. The equalizing chamber is in communication with the second work chamber through the bottom valve assembly. There are further provided a first bypass channel coupling the first and second work chambers with one another through the hollow piston rod; a second bypass channel coupling the second work chamber with the equalizing chamber by circumventing a bottom valve of the bottom valve assembly; and a setting device for controlling the first and second bypass channels as a function of relative rotary displacements between the damping cylinder and the piston rod.

According to the invention, the setting elements which adjust the flow passage of the bypass channel interconnecting the work chambers also control a bypass channel bridging the pressure-dependent bottom valve. The bypass channel bridging the bottom valve is, according to a preferred embodiment of the invention, controlled in the pressing phase by a pressure-dependent valve.

According to a preferred embodiment of the invention, the first setting element coupled directly or indirectly in a relatively non-rotatable manner with the piston rod is situated in a second setting element which is connected relatively non-rotatably with the damping cylinder and controls at least one opening in the second setting element leading to the bypass channel between the work chambers and also leading to the bypass channel between the second (lower) work chamber and the equalizing chamber of the shock absorber. In another preferred embodiment of the invention, the setting element connected in a relatively non-rotatable manner with the damping cylinder is disposed in the setting element which is connected directly or indirectly with the piston rod in a relatively non-rotatable manner and controls at least one opening provided in the setting element coupled with the piston rod.

The setting element coupled with the damping cylinder and the valve block of the bottom valve preferably constitute a single structural unit.

According to a further preferred embodiment of the invention, the flow passage areas of the bypass channels are continuously (steplessly) adjusted as a function of the relative rotary displacements of the damping cylinder and piston rod and thus as a function of the relative rotary displacements between wheel and vehicle chassis. In a further preferred embodiment of the invention, both bypass channels may be turned on or off as a function of the rotary displacement between the damping cylinder and the piston rod.

According to a particularly advantageous embodiment, the control edges of the setting elements are so arranged that the flow passage cross sections of the bypass channels may be set differently dependent from the steering angle.

The invention is particularly advantageous in that a mechanical control of the damping force of a dual-tube shock absorber may be effected within wide limits as a function of the motion of the wheel relative to the vehicle chassis.

DESCRIPTION OF THE PREFERRED EMBODIMENTS

Figure 1:
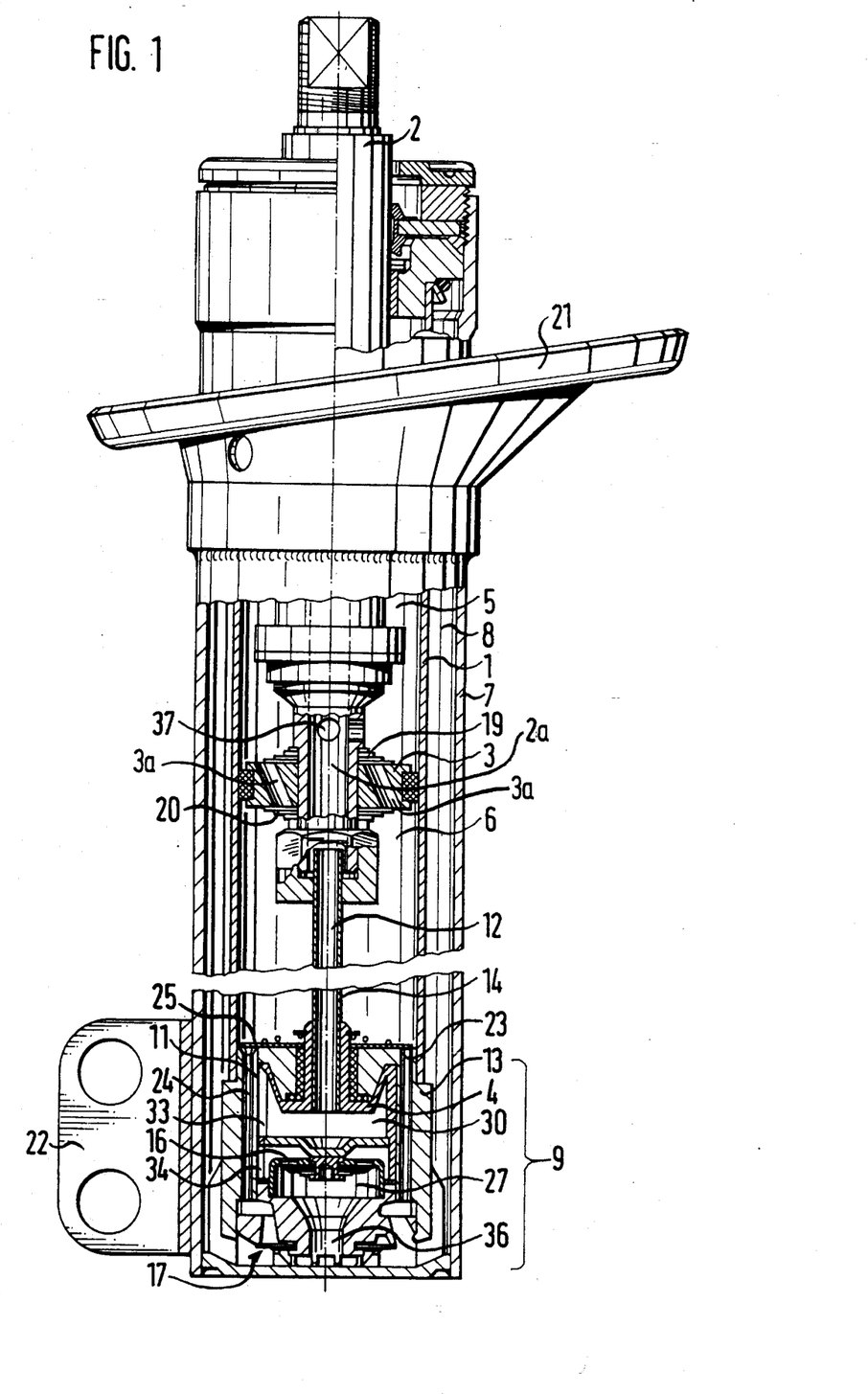
FIG. 1 is an axial sectional view of a dual-tube shock absorber incorporating the invention.

In FIG. 1 a dual-tube McPherson strut (shock absorber) for a steerable vehicle wheel is shown. The strut, in essence, is formed of a damping cylinder 1 filled with a damping liquid, a damping piston 3 slidably disposed in the damping cylinder 1 and dividing the inner space thereof into two work chambers 5 and 6. The piston 3 is provided with ports 3a, which couple the work chambers 5 and 6 and which are controlled by pressure-dependent spring disc valves 19 and 20. A piston rod 2 is, at a lower end, secured to the piston 3. The damping cylinder 1 is surrounded by an outer tube 7 for defining therewith an equalizing chamber 8 for the liquid volume displaced by the reciprocating piston rod 2. On the outer tube 7 there is mounted a spring seat disc 21 for supporting an end of a non-illustrated coil spring as well as a mounting flange 22 for the wheel carrier, also not shown.

The lower work chamber 6 and the equalizing chamber 8 are connected via a bottom valve assembly 9 which, similarly to the damping piston 3, is provided with ports 23 and 24 for the pulling and pressing phases. The ports 23, 24 are controlled by valve spring discs 25, 17. The biased valve spring discs 17 generate an appropriate damping force during the pressing phase, whereas the valve spring discs 25 serve only as a check valve. By virtue of the valves of the damping piston 3 and the bottom valve assembly 9, the required damping force is generated in the shock absorber upon inward motion (pressing phase) or outward motion (pulling phase) of the piston rod 2.

The work chambers 5 and 6 are coupled to one another by a controllable bypass channel composed of channel portions 12, 30, 33, 24. The bypass channel extends from a port 37 passing radially through the piston rod 2 and connecting the work chamber 5 with the axial bore 2a of the piston rod 2 and then the bypass channel extends through the axial passage 12 of a control rod 14 slidably and relatively non-rotatably connected to the piston rod 2. The bypass channel further extends to a setting element 4 which is constituted by a rotary plunger and which controls apertures 11 provided in a second setting element 13, leading to the lower work chamber 6. In order to provide a soft damping force characteristic in the bottom valve assembly 9, the setting element 4 simultaneously cooperates with a "more softly" set pressure phase valve 16 provided in a bypass channel composed of channel portions 24, 34, 27, 36 leading to the equalizing chamber 8.

When the wheel connected to the securing flange 22 executes a steering motion relative to the vehicle chassis to which the piston rod 2 is secured, a rotary displacement occurs between the damping cylinder 1 connected with the outer tube 7 and the piston rod 2 and thus between the setting element 4 which is relatively non-rotatably connected with the piston rod 2 and the setting element 13 connected with the damping cylinder 1. The setting element 4 closes the port 11 and thus shuts off the bypass channel 12, 30, 34, 24 and the bypass channel 24, 34, 27, 36, whereby a harder (stiffer) damping characteristic of the strut (shock absorber) is achieved during curvilinear travel of the vehicle.

Figure 2:
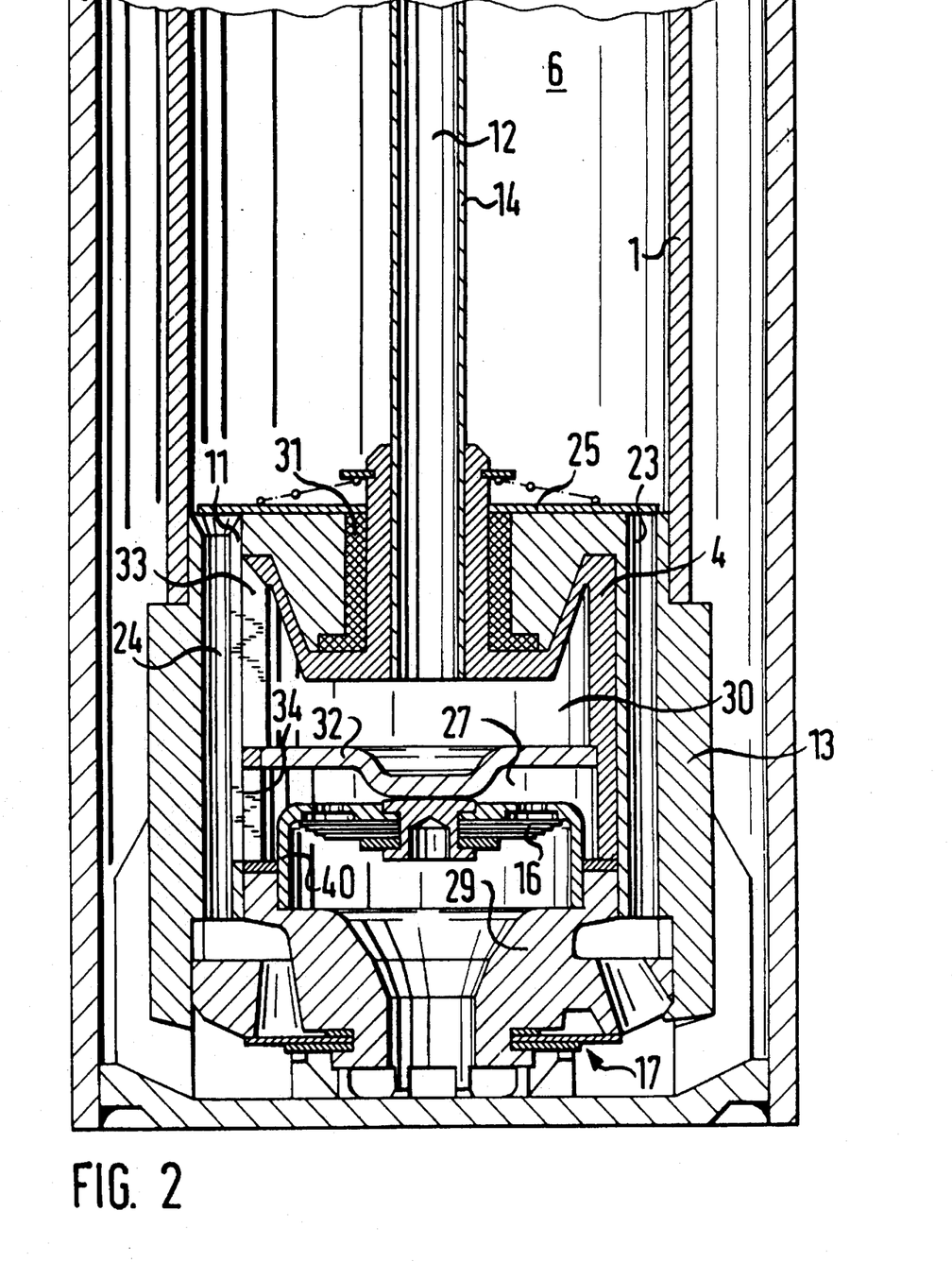
FIG. 2 is an axial sectional view, on an enlarged scale, of further details of one part of the construction shown in FIG. 1.

Also referring to FIG. 2, the setting element 4 is fixedly connected with the cross-sectionally rectangular control rod 14. In this embodiment the setting element 13 forms an integral part with a bottom valve block 29 of the bottom valve assembly 9. The ports 23 and 24 controlled by the bottom valve 17 extend through the setting element 13. The bottom valve block 29 accommodates the valve 17 which yields in the pressing phase, whereas the valve 25 is secured to the top of the setting element 13 and yields in the pulling phase. The port 24 is coupled with the inner valve chambers 30 and 27 of the bottom valve assembly 9 via the port 11. The setting element 4 which is supported in a bushing sleeve 31 is situated in the inner valve space and contains the channel portions 33, 34 (separated by a lid 32) of the bypass channel between the work chambers 5, 6 and the bypass channel between the work chamber 6 and the equalizing chamber 8. The "soft" valve 16 for the pressing phase is supported by a structural component 40. By virtue of a motion of the damping cylinder 1 connected with the wheel carrier, relative to the non-illustrated piston rod connected with the vehicle chassis, the setting element 4 closes the port 11 by virtue of rotation of the openings 33 and 34 in the setting element 13 and thus closes both bypass channels and thereby sets a hard damping characteristic in the pulling and pressing phases.

Figure 3A:
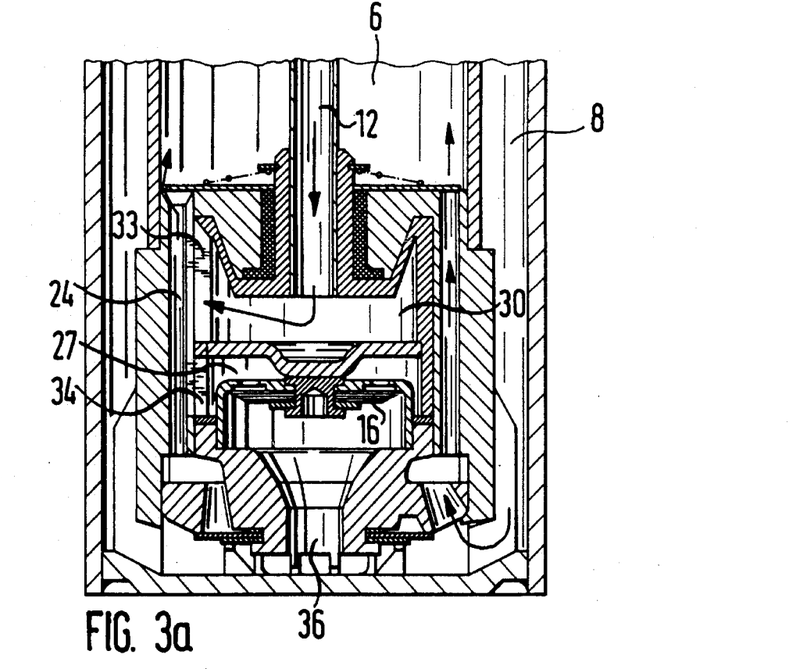
FIGS. 3a, 3b, 3c and 3d are axial sectional views similar to FIG. 2, illustrating operational stages during the pulling and the pressing phases.
Figure 3B:
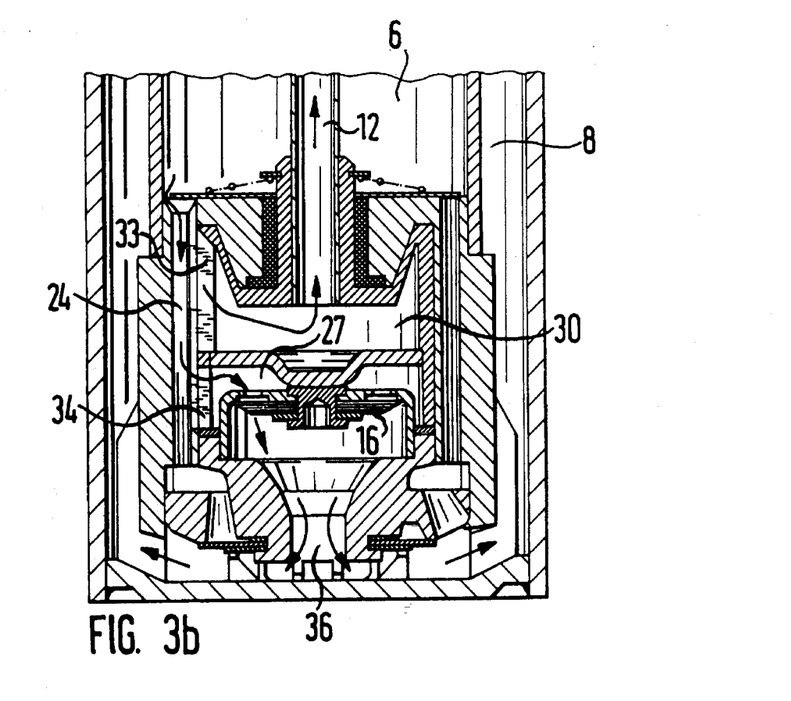
Figure 3C:
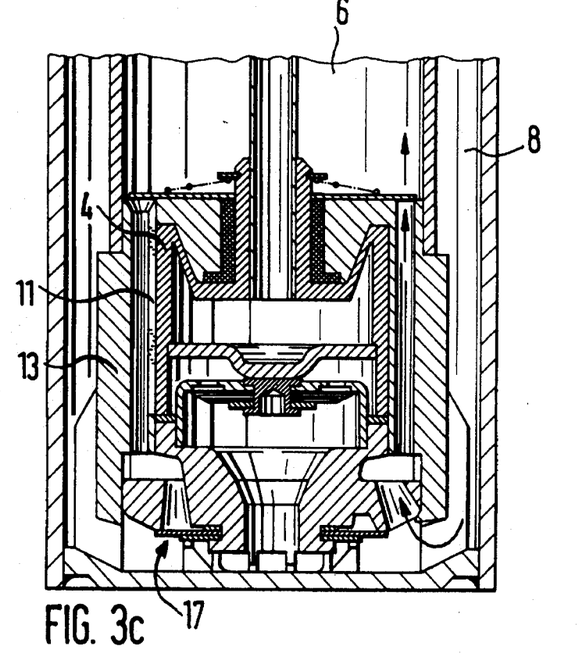

FIGS. 3a, 3b, 3c and 3d show the mode of operation of the above-described bypass control. In straight-line travel, that is, when there is no turning motion between the wheel and the chassis, the bypass channel 12, 30, 33, 24 between the work chambers 5 and 6 and the bypass channel 24, 34, 27 and 36 between the work chamber 6 and the equalizing chamber 8 are open. The arrows in FIG. 3a show the flow path of the damping liquid in the "soft" pulling phase whereas the arrows in FIG. 3b show the flow path of the "soft" pressing phase.

Figure 3D:
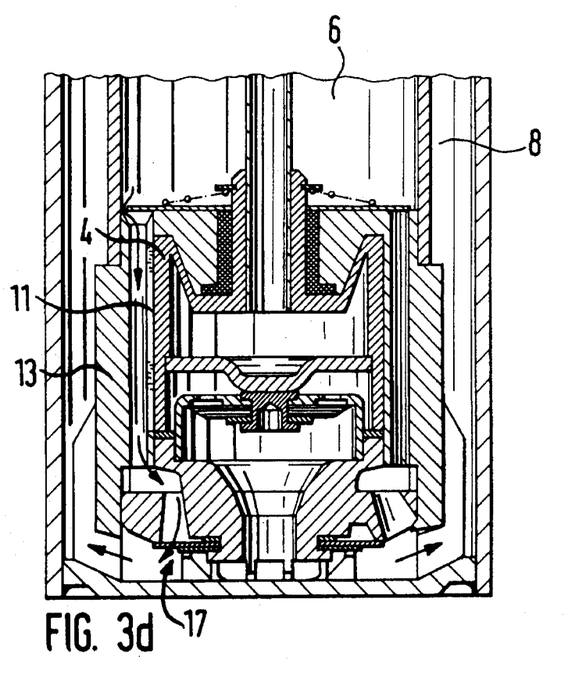

During curvilinear travel, that is, upon a rotary motion between the wheel and the chassis and thus between the piston rod 2 and the damping cylinder 1, the setting element 4 closes the port 11 in the setting element 13 and thus the damping force is generated in the pulling phase via the non-illustrated damping piston and in the pressing phase via the valve spring discs of the "hard" valve 17. The flow path of the damping liquid is shown across the bottom valve assembly in the hard pulling phase (FIG. 3c) and in the hard pressing phase (FIG. 3d).

Figure 4:
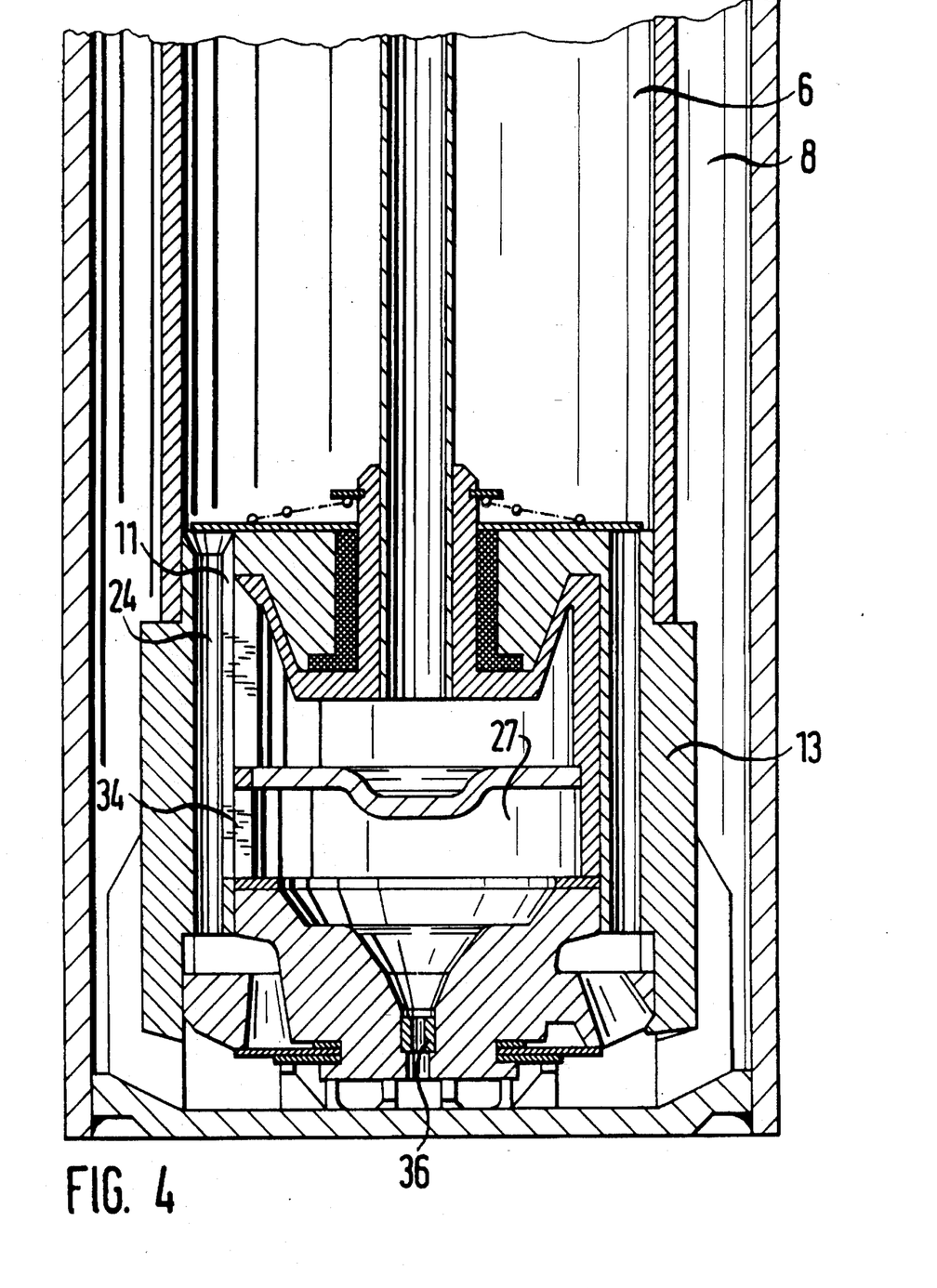
FIG. 4 is an axial sectional view of a bypass valve arrangement according to a preferred embodiment of the invention, having no pressure-dependent spring disc valve in the pressing direction.

FIG. 4 shows a further bypass valve arrangement from which the soft pressing phase valve in the bypass 24, 34, 27, 36 is omitted between the work chamber 6 and the equalizing chamber 8. Upon straight line travel, that is, when the port 11 in the setting element 13 is open, the damping force in the pressing phase is countersupported only by the gas pressure in the equalizing chamber 8.

Figure 5:
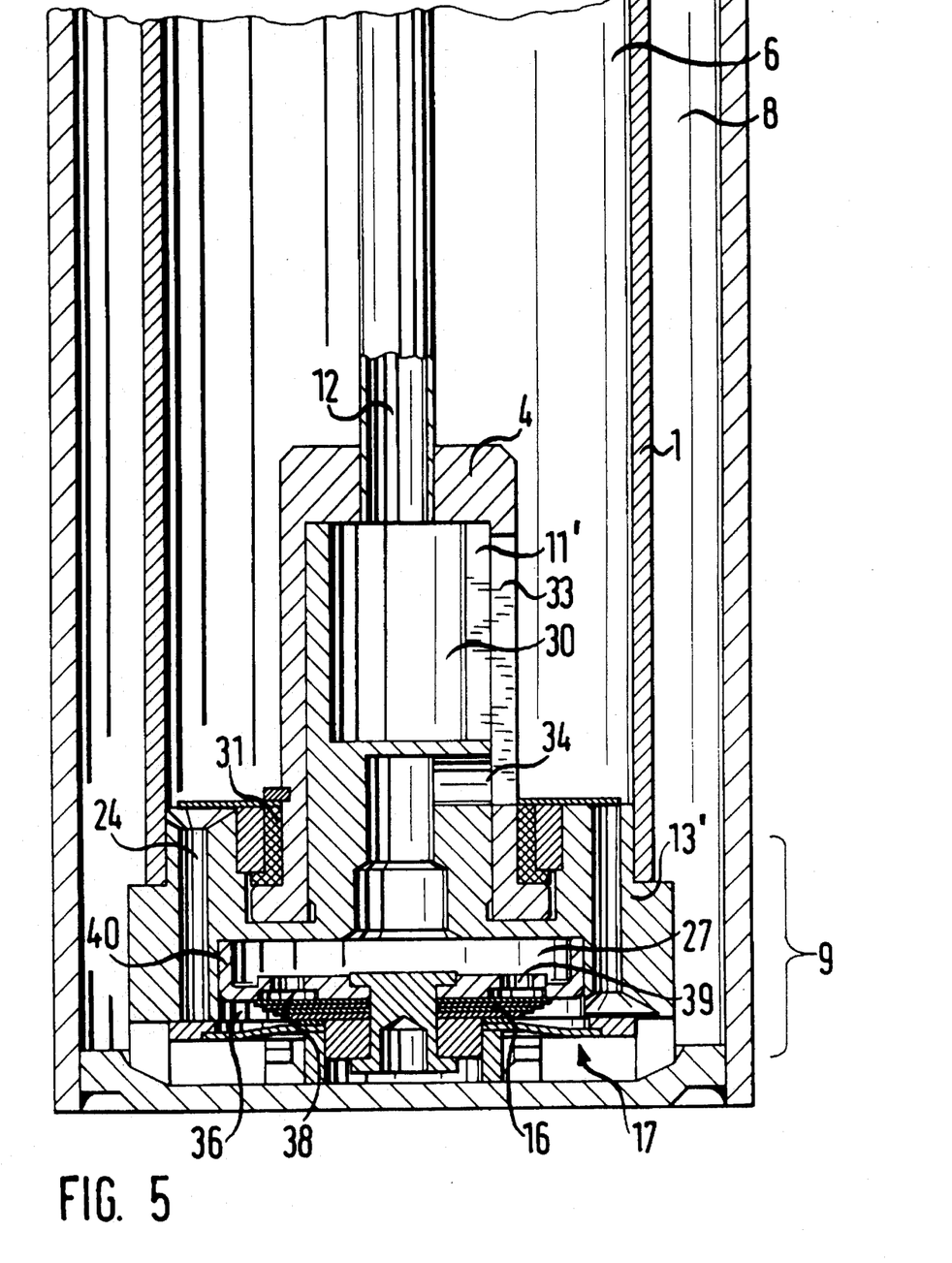
FIG. 5 is an axial sectional view similar to FIG. 4, illustrating another preferred embodiment of the invention provided with a pressure-dependent spring disc valve for the pressing phase.

FIG. 5 shows a valve arrangement having a second "softer" pressing phase valve 16 in the bypass 34, 27, 36 connecting the equalizing chamber 8 with the work chamber 6. The setting element 13' forms a structural unit with the valve body of the conventional bottom valve assembly 9. The setting element 4' connected via the control rod 14 with the piston rod (not shown in FIG. 5) surrounds the setting element 13 which is not rotatable relative to the damping cylinder 1. The setting element 13' is provided with ports 11' and is supported in the sleeve 31. The bypass channels 12, 33, 30 and 34, 27, 36 do not extend through the ports 24 of the bottom valve assembly 9. The "soft", pressure-dependent valve 16 (controlling the bypass channel 34, 27, 36) which may be rendered ineffective as a function of the angular steering displacement, is carried by a dished component 40. The latter is provided with ports 38, 39 and is situated in the inner valve chamber 27. In the pulling direction during straight-line travel only the bypass 12, 33, 30 between the work chambers 5 and 6 is effective, while the bypass 34, 27, 36 is closed by the hard pressing phase valve 17 functioning as a check valve.

It will be understood that the above description of the present invention is susceptible to various modifications, changes and adaptations, and the same are intended to be comprehended within the meaning and range of equivalents of the appended claims.

What is claimed is:

1. A shock absorber for an automotive vehicle, comprising
   (a) a damping cylinder having a cylinder chamber containing damping fluid;
   (b) a damping piston axially slidably received in said damping cylinder; said damping piston dividing said cylinder chamber into first and second work chambers; in a pressing phase said damping piston moving axially in a direction tending to reduce a volume of said second work chamber; in a pulling phase said damping piston moving axially in a direction tending to increase a volume of said second work chamber; said damping piston including a bore coupling the work chambers to one another;
   (c) pressure-responsive valve means mounted on said damping piston for controlling said bore in said pressing and pulling phases;
   (d) an axially hollow piston rod affixed to said damping piston and extending axially in said damping cylinder;
   (e) an outer tube coaxially surrounding said damping cylinder and defining an equalizing chamber therewith;
   (f) a bottom valve assembly provided in said second work chamber; said equalizing chamber being in communication with said second work chamber through said bottom valve assembly;
   (g) means for defining a first bypass channel coupling said first work chamber with said equalizing chamber through said hollow piston rod by circumventing a bottom valve of said bottom valve assembly;
   (h) means for defining a second bypass channel coupling said second work chamber with said equalizing chamber by circumventing said bottom valve; and
   (i) setting means for varying cross-sectional flow passage areas of said first and second bypass channels as a function of relative rotary displacements between said damping cylinder and said piston rod.

2. The shock absorber as defined in claim 1, further comprising a pressure-responsive valve arranged in said second bypass channel for controlling a flow passage of said second bypass channel in response to pressures in said pressing phase.

3. The shock absorber as defined in claim 1, wherein said setting means comprises a first setting element and a second setting element; said first setting element being non-rotatable relative to said piston rod and being at least indirectly connected therewith; said second setting element being non-rotatable relative to said damping cylinder and being coupled therewith; said first setting element being disposed in said second setting element; said first bypass channel and said second bypass channel having a common channel portion; said first and second setting elements jointly controlling a flow passage cross section of said common channel portion.

4. The shock absorber as defined in claim 1, wherein said setting means comprises a first setting element and a second setting element; said first setting element being non-rotatable relative to said piston rod and being coupled therewith; said second setting element being non-rotatable relative to said damping cylinder and being coupled therewith; said first setting element being disposed in said second setting element; said first setting element including a channel portion forming a common part of said first and second bypass channels; said second setting element controlling said channel portion.

5. The shock absorber as defined in claim 1, wherein said setting means comprises a first setting element and a second setting element; said first setting element being non-rotatable relative to said piston rod and being coupled therewith; said second setting element being non-rotatable relative to said damping cylinder and being coupled therewith; said first setting element being disposed in said second setting element; said bottom valve assembly including a valve block provided with a channel portion forming part of said second bypass channel; said valve block and said second setting element constituting a single-piece structure.

6. The shock absorber as defined in claim 5, further comprising a check valve mounted on said valve block and controlling said first and second bypass channels.

7. The shock absorber as defined in claim 2, wherein said pressure-responsive valve has softer damping force characteristics than said bottom valve.

8. The shock absorber as defined in claim 1, wherein said setting means comprises means for steplessly varying a flow passage cross section of said first and second bypass channels upon a relative rotary displacement between said damping cylinder and said piston rod.

9. The shock absorber as defined in claim 1, wherein said setting means comprises means for opening and closing a flow passage cross section of said first and second bypass channels upon a relative rotary displacement between said damping cylinder and said piston rod.

10. The shock absorber as defined in claim 1, further comprising means for closing said second bypass channel in the pulling phase.

11. The shock absorber as defined in claim 1, wherein said setting means comprises a first setting element and a second setting element; said first setting element being non-rotatable relative to said piston rod and being coupled therewith; said second setting element being non-rotatable relative to said damping cylinder and being coupled therewith; said first and second setting elements having flow apertures bordered by control edges; said flow apertures forming part of said first and second bypass channels; said control edges of said first and second setting elements cooperating such that cross-sectional flow passage areas of said first bypass channel are settable differently from cross-sectional flow passage areas of said second bypass channel.

12. The shock absorber as defined in claim 1, further comprising an axially hollow control rod secured to said bottom valve assembly; said hollow control rod being relatively axially slidably and relatively non-rotatably coupled to said axially hollow piston rod; said axially hollow control rod maintaining fluid communication between said axially hollow piston rod and said first bypass channel.

* * * * *